(12) United States Patent
Nishimura et al.

(10) Patent No.: US 8,375,702 B2
(45) Date of Patent: Feb. 19, 2013

(54) EXHAUST EMISSION CONTROL SYSTEM FOR ENGINE AND CONTROL METHOD THEREFOR

(75) Inventors: Hiroyuki Nishimura, Fuchu-cho (JP); Yoshiaki Tomita, Hiroshima (JP); Masato Katsuta, Hiroshima (JP)

(73) Assignee: Mazda Motor Corporation (JP)

( * ) Notice: Subject to any disclaimer, the term of this patent is extended or adjusted under 35 U.S.C. 154(b) by 602 days.

(21) Appl. No.: 12/548,385

(22) Filed: Aug. 26, 2009

(65) Prior Publication Data
US 2010/0071351 A1    Mar. 25, 2010

(30) Foreign Application Priority Data

Sep. 22, 2008    (JP) ................................. 2008-243325

(51) Int. Cl.
*F01N 3/00* (2006.01)
(52) U.S. Cl. ............................... 60/286; 60/295; 701/22
(58) Field of Classification Search .................... 60/286, 60/295; 180/65; 701/22, 70, 112
See application file for complete search history.

(56) References Cited

U.S. PATENT DOCUMENTS

| | | | | |
|---|---|---|---|---|
| 5,884,475 | A * | 3/1999 | Hofmann et al. ................. | 60/274 |
| 6,595,307 | B2 * | 7/2003 | Suzuki ..................... | 180/65.235 |
| 6,895,744 | B2 * | 5/2005 | Osawa ............................ | 60/277 |
| 7,886,525 | B2 * | 2/2011 | Nishibu et al. .................. | 60/286 |
| 2004/0016416 | A1 | 1/2004 | Ichihara et al. | |
| 2007/0163232 | A1 | 7/2007 | Ueno | |
| 2009/0077949 | A1 * | 3/2009 | Kleinknecht .................... | 60/286 |
| 2009/0288395 | A1 * | 11/2009 | Haeberer et al. ................. | 60/286 |
| 2010/0076656 | A1 * | 3/2010 | Hiyoshi et al. ................... | 701/70 |
| 2010/0229532 | A1 | 9/2010 | Ohno | |

FOREIGN PATENT DOCUMENTS

| | | |
|---|---|---|
| DE | 10 2007 000 538 A1 | 5/2008 |
| JP | 2000-27627 A | 1/2000 |
| JP | 2004-44567 A | 2/2004 |
| JP | 2005-113688 A | 4/2005 |
| JP | 2006-118413 A | 5/2006 |

(Continued)

OTHER PUBLICATIONS

Extended European Search Report dated Feb. 8, 2010; Application No. 09167603.1-2321 with English Translation.
Japanese Office Action "Notification of Reasons for Rejection" issued Jul. 10, 2012; Japanese Patent Application No. 2008-243325 with English summary.

*Primary Examiner* — Thomas Denion
*Assistant Examiner* — Anthony Ayala Delgado
(74) *Attorney, Agent, or Firm* — Studebaker & Brackett PC; Donald R. Studebaker

(57) ABSTRACT

An exhaust emission control system, which comprises control means 8 operable, in response to satisfaction of a given stop condition, to automatically stop an engine, and subsequently, in response to satisfaction of a given restart condition, to automatically restart the automatically stopped engine, a flow passage 6 adapted for an aqueous urea solution for reducing nitrogen oxides contained in exhaust gas of the engine, and supply/recovery means 7 adapted to drive a pump 10 to supply an aqueous urea solution to the flow passage and recover an aqueous urea solution from the flow passage. The control means is operable, when the engine is forcibly stopped by turning off an ignition switch, to instruct the supply/recovery means 7 to recover an aqueous urea solution from the flow passage 6, and, when automatically stopping the engine in response to satisfaction of the given stop condition, to prohibit the supply/recovery means 7 from recovering an aqueous urea solution from the flow passage 6.

10 Claims, 3 Drawing Sheets

FOREIGN PATENT DOCUMENTS

| | | |
|---|---|---|
| JP | 2008-101564 A | 5/2008 |
| JP | 2009-97348 A | 5/2009 |
| WO | WO 2006064028 A1 * | 6/2006 |
| WO | WO 2008062615 A1 * | 5/2008 |

* cited by examiner

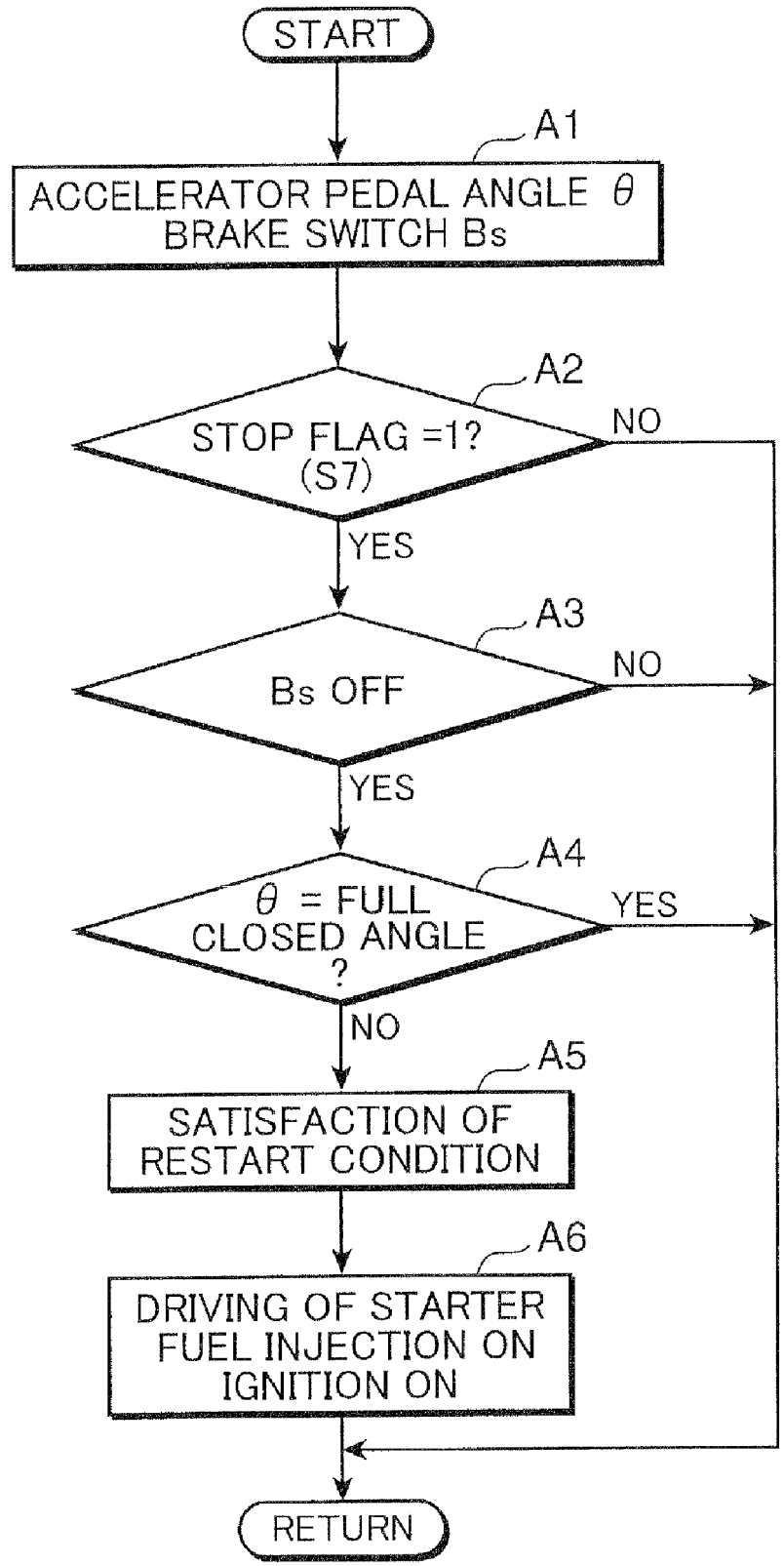

EXHAUST EMISSION CONTROL SYSTEM FOR ENGINE AND CONTROL METHOD THEREFOR

BACKGROUND OF THE INVENTION

1. Field of the Invention

The present invention relates to an exhaust emission control system for an engine, and a method of controlling the exhaust emission control system.

2. Description of the Background Art

As an exhaust emission control system for purifying nitrogen oxides (NOx) contained in exhaust gas of an engine, there has been known one type using ammonia as a reducing agent for a catalyst for selective catalytic reduction (SCR) of NOx (hereinafter referred to as "NOx SCR catalyst"). In this type of exhaust emission control system, an aqueous urea solution is added into exhaust gas in an exhaust passage and hydrolyzed by heat of the exhaust gas, and ammonia produced by the hydrolysis is supplied to and absorbed by a NOx SCR catalyst disposed in a downstream region of the exhaust passage. Through this process, a denitration reaction between the ammonia and NOx contained in the exhaust gas is promoted to purify the NOx.

On the other hand, the above exhaust gas emission control system has some problems.

A first problem is so-called "ammonia slip". In view of enhancing NOx conversion efficiency, it is desirable to allow ammonia to be absorbed by a NOx SCR catalyst in a larger amount. However, the NOx SCR catalyst has limitations in an absorption amount of ammonia. If ammonia is excessively supplied to a NOx SCR catalyst, a part of the ammonia will pass through the NOx SCR catalyst as unreacted or slipped ammonia, and the slipped ammonia will be released directly into the atmosphere, i.e., ammonia slip will occur.

A second problem is an allowable ambient temperature range for an aqueous urea solution. Generally, a concentration of urea in the aqueous urea solution is set at a value which allows a freezing temperature of the aqueous urea solution to become the lowest value. However, the lowest freezing temperature is $-11°$ C. ($=12°$ F.) at best. Thus, considering that an ambient temperature in cold regions often drops below the lowest freezing temperature, there remains a high risk of freezing of the aqueous urea solution in such low-temperature environments. If an aqueous urea solution remaining in an aqueous-urea-solution supply passage is frozen, resulting volumetric expansion thereof is likely to cause burst of the aqueous-urea-solution supply passage. Reversely, in high-temperature environments, water contained in an aqueous urea solution remaining in the aqueous-urea-solution supply passage will be vaporized to cause an increase in concentration of urea in the resulting aqueous urea solution. Thus, the freezing temperature of the resulting aqueous urea solution becomes higher to cause a higher risk of freezing in the low-temperature environments. As above, an allowable ambient temperature range for the aqueous urea solution is narrow, and there is a need for measures against this problem As measures against freezing of an aqueous urea solution remaining in the aqueous-urea-solution supply passage, it is contemplated to install a heater in the aqueous-urea-solution supply passage or use an additive capable of lowering the freezing temperature. As another measure, JP 2008-101564A (hereinafter referred to as "Patent Document 1") proposes a technique of, after stopping an engine, driving a pump to suck back an aqueous urea solution remaining in an aqueous-urea-solution supply passage, so as to recover the aqueous urea solution to an aqueous-urea-solution tank. This technique is excellent in terms of capability to prevent damage of the aqueous-urea-solution supply passage.

Recent years, a vehicle having a function of automatically stopping an engine, for example, during stop of the vehicle at a red light, and automatically restarting the engine in response to detection of a driver's operation for starting moving the vehicle, so-called "idling stop (automatic engine stop/start) function", as one exhaust emission control function, has become increasingly popular.

However, if an exhaust emission control system is designed to have both the idling stop function, and the aqueous-urea-solution recovery function as disclosed in the Patent Document 1, the following problems will occur.

Typically, the aqueous-urea-solution recovery operation as disclosed in the Patent Document 1 is required to take about several tens of seconds. On the other hand, as might be expected, a time-period after an engine is automatically stopped through until the engine is automatically restarted (a time-period between an automatic engine stop and an automatic engine restart) according to the idling stop function is not constant. Thus, there is a possibility that, after the pump is driven to start recovering an aqueous urea solution remaining in the aqueous-urea-solution supply passage, in response to the automatic engine stop, the engine is automatically restarted within a short time-period (e.g., several seconds). In this case, the pump driving for the recovery operation is unnecessary in terms of preventing damage of the aqueous-urea-solution supply passage, i.e., anti-freezing.

Moreover, in this case, a part of the aqueous urea solution remains in the aqueous-urea-solution supply passage without being recovered. Then, in response to the automatic engine restart, the pump is driven to start supplying an aqueous urea solution so as to pre-fill the supply passage with the aqueous urea solution. During this operation, it is necessary to supply the aqueous urea solution while allowing air in the supply passage to be released therefrom. Specifically, it is common practice to open an aqueous-urea-solution addition value in response to start of the pre-filling operation, and then close the aqueous-urea-solution addition value when an amount of the supplied aqueous urea solution reaches a predetermined amount (e.g., 80% of the entire volume of the supply passage is pre-filled with the aqueous urea solution). Thus, if the aqueous urea solution remains in the aqueous-urea-solution supply passage as described above, a leakage of the aqueous urea solution from the aqueous-urea-solution addition value occurs, which is likely to cause ammonia slip.

These are problems in an exhaust emission control system having both the idling stop function and the aqueous-urea-solution recovery function.

SUMMARY OF THE INVENTION

It is therefore an object of the present invention to provide an exhaust emission control system having both an automatic engine stop/restart function and an aqueous-urea-solution recovery function, which is capable of suppressing unnecessary driving of a pump in connection with an operation of recovering an aqueous urea solution, while preventing leakage of the aqueous urea solution.

In order to achieve the above object, according to one aspect of the present invention, there is provided an exhaust emission control system for an engine, which comprises: control means operable, in response to satisfaction of a given stop condition, to automatically stop the engine, and subsequently, in response to satisfaction of a given restart condition, to automatically restart the automatically stopped engine; a flow passage for an aqueous urea solution for reducing nitrogen oxides contained in exhaust gas of the engine; and supply/recovery means adapted to drive a pump to supply an aqueous urea solution to the flow passage and recover an aqueous urea solution from the flow passage, wherein the control means is operable, when the engine is forcibly stopped by turning off an ignition switch, to instruct the supply/recovery means to recover an aqueous urea solution from the flow passage, and, when automatically stopping the engine in response to satisfaction of the given stop condition, to prohibit the supply/recovery means from recovering an aqueous urea solution from the flow passage.

The exhaust emission control system of the present invention can suppress unnecessary driving of the pump, and leakage of an aqueous urea solution during re-supply of an aqueous urea solution.

These and other objects, features and advantages of the invention will become more apparent upon reading the following detailed description along with the accompanying drawings.

BRIEF DESCRIPTION OF THE DRAWINGS

FIG. 3 is a flowchart showing an automatic engine restart control process in the engine exhaust emission control system according to the embodiment.

DESCRIPTION OF THE PREFERRED EMBODIMENTS

With reference to the drawings, the present invention will now be specifically described based on a preferred embodiment thereof. Although the following embodiment will be shown and described by way of specific example advantageous to implementation of the present invention, the present invention is not limited to the embodiment. Further, a combination of various features described in the following embodiment is not necessarily fully required as essential elements of the present invention.

Figure 1:
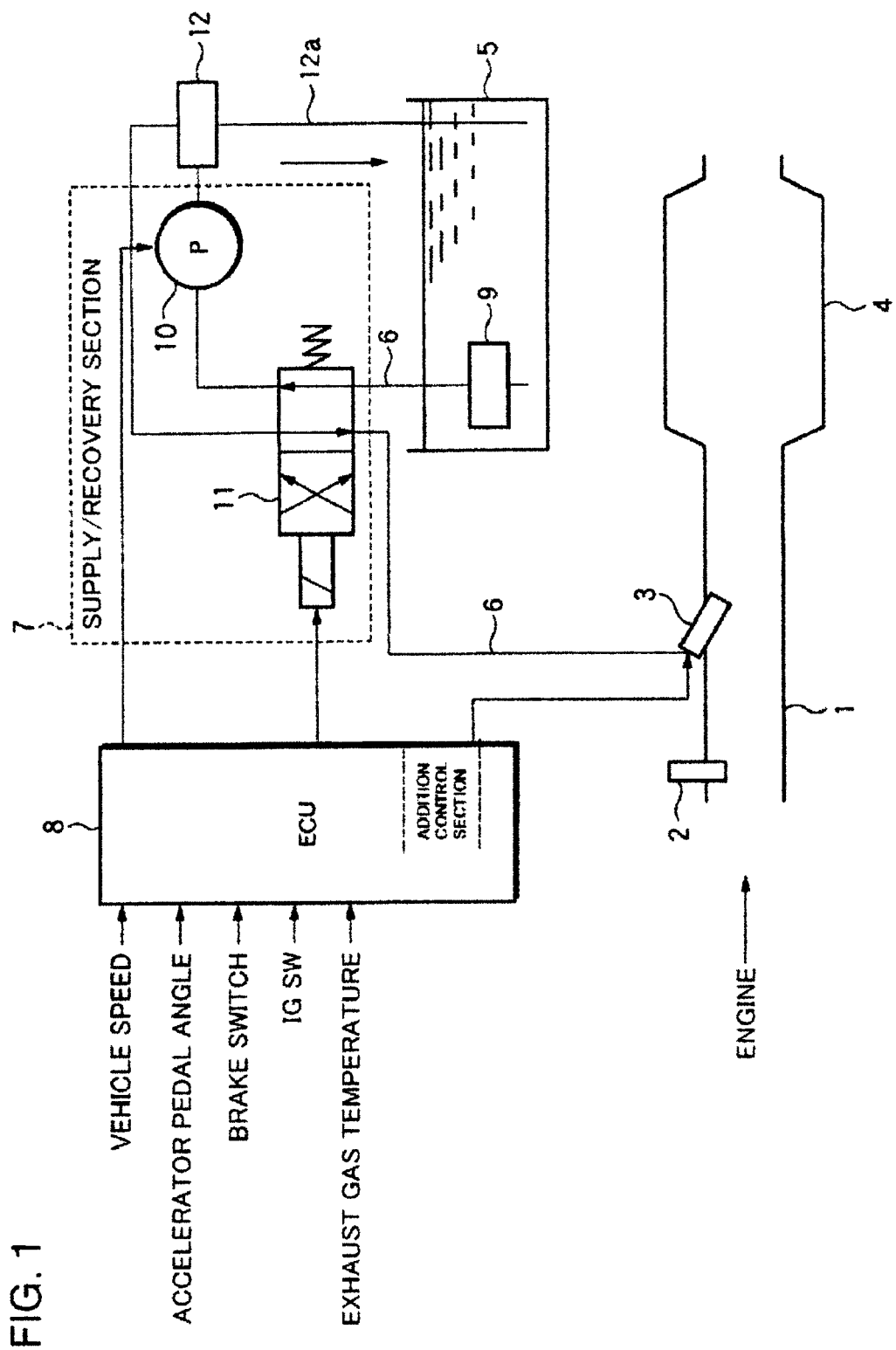
FIG. 1 is a schematic diagram showing an engine exhaust emission control system according to one embodiment of the present invention.

FIG. 1 is a schematic diagram showing an engine exhaust emission control system according to one embodiment of the present invention.

An exhaust pipe 1 is connected to an engine (not shown; e.g., diesel engine). The exhaust pipe 1 has an exhaust gas temperature sensor 2 operable to detect an exhaust gas temperature, an addition valve 3 adapted to supply an aqueous urea solution into the exhaust pipe 1, and a catalyst for selective catalytic reduction (SCR) of NOx (hereinafter referred to as "NOx SCR catalyst 4"), which are arranged in this order in a downstream direction of an exhaust gas stream. An aqueous urea solution supplied from the addition valve 3 into the exhaust pipe 1 is hydrolyzed by heat of exhaust gas in the exhaust pipe 1, to produce ammonia. The produced ammonia is added to the downstream NOx SCR catalyst 4, so that NOx in the exhaust gas is reduced and removed by the ammonia.

The aqueous urea solution is stored in a tank 5, and the tank 5 and the addition value 3 are connected to each other through an aqueous-urea-solution flow passage 6. A filter 9 for filtering the aqueous urea solution is interposed in the flow passage 6 at a position inside the tank 5 and close to an end of the flow passage 6. Further, a supply/recovery section 7 is provided in an intermediate portion of the flow passage 6 to supply the aqueous urea solution to the flow passage 6 and recover an aqueous urea solution remaining in the flow passage 6.

An electronic control unit (ECU) 8 (also referred to as control means, control unit or control section) is adapted to perform an automatic engine stop/restart control, and control the addition valve 3 and the supply/recovery means 7. The ECU 8 is connected, but not shown, to a vehicle speed sensor, an accelerator pedal angle sensor, a brake sensor, an ignition switch, and the exhaust gas temperature sensor 2, and adapted to acquire information about a vehicle speed S, an accelerator pedal angle θ, a brake switch position Bs, an ignition switch position IGs and an exhaust gas temperature Te, from respective ones of the above sensors.

The supply/recovery section 7 comprises a pump 10 adapted to be driven according to a drive signal from the ECU 8, and a directional selector valve 11 adapted to select one of two flow directions of the aqueous urea solution in the flow passage 6 according to a selection signal from the ECU 8. In FIG. 1, the directional selector valve 11 is in an OFF position (turned off). In the OFF position, the flow direction of the aqueous urea solution is a direction for supplying the aqueous urea solution toward the addition valve 3 (supply direction). Specifically, when the pump 10 is driven under the condition that the directional selector valve 11 is in the OFF position, an aqueous urea solution in the tank 5 is pumped up, and discharged from the pump 10 after being filtered through the filter 9. The aqueous urea solution discharged from the pump 10 is controlled to have a given supply pressure by a pressure control valve 12. Through this pressure control, an excessive portion of the aqueous urea solution is returned to the tank 5 via a drain pipe 12a. The remaining aqueous urea solution discharged from the pressure control valve 12 at the given supply pressure is supplied to the addition valve 3 via the flow passage 6 through the directional selector valve 11. The addition valve 3 is opened (turned on) according to a control signal from the ECU 8 to inject the supplied aqueous urea solution. When the directional selector valve 11 in an ON position (turned on), the other flow direction (recovery direction) is selected to recover the aqueous urea solution remaining in the flow passage 6.

Alternatively, a pump capable of being rotationally driven in normal and reverse directions may be employed as the pump 10 without providing the directional selector valve 11. In this case, the pump may be rotationally driven in the normal direction to supply an aqueous urea solution toward the addition valve 3, and rotationally driven in the reverse direction to recover an aqueous urea solution from the flow passage 6.

Figure 2:
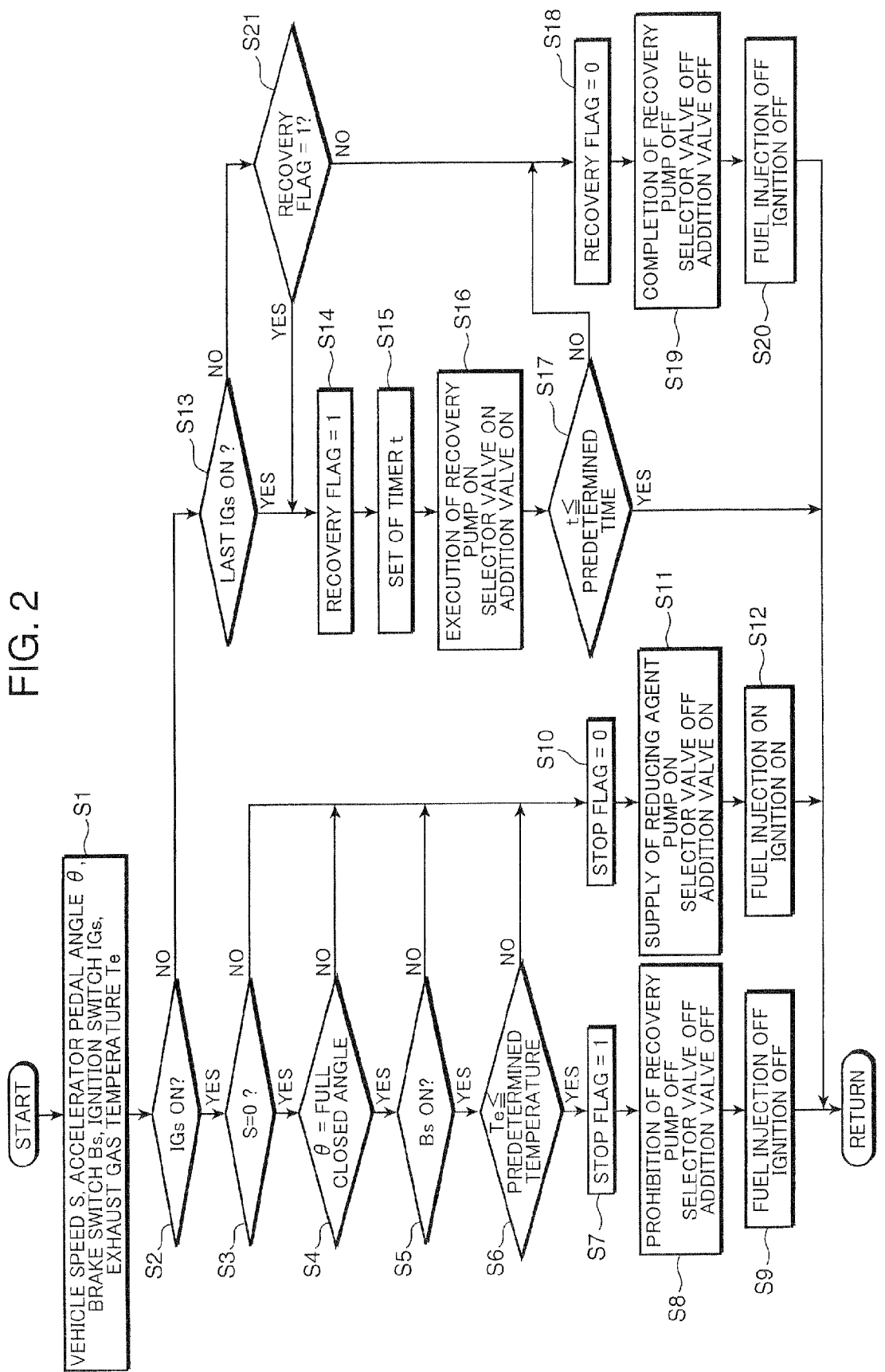
FIG. 2 is a flowchart showing an engine control process and an exhaust gas emission control process in the engine exhaust emission control system according to the embodiment.

FIG. 2 is a flowchart showing an engine control process and an exhaust gas emission control process in the engine exhaust emission control system according to the embodiment. This control process is repeatedly executed in a given cycle period by the ECU 8.

In Step S1, information about the vehicle speed S, the accelerator pedal angle θ, the brake switch position Bs, the ignition switch position IGs and the exhaust gas temperature Te, are acquired.

Then, in Step S2, it is determined whether the ignition switch position IGs is an ON position. If it is determined that the ignition switch position IGs is the ON position, the routine advances to Step S3. If it is determined that the ignition switch position IGs is an OFF position, the routine advances to Step S13.

In Steps S3 to S6, it is determined whether automatic engine stop conditions are satisfied. Specifically, if it is determined that: the vehicle speed S is zero, i.e., a vehicle is stopped (Step S3); the accelerator pedal angle θ is a full closed angle (Step S4); the brake switch position Bs is an ON position (Step S5); and the exhaust gas temperature Te is equal to or less than a predetermined value (Step 6), it is finally determined that the automatic engine stop conditions are satisfied, and the routine advances to Step S7. If any one of the conditions in Steps S3 to S6 is not satisfied, it is determined that the automatic engine stop conditions are not satisfied, and the routine advances to Step S10.

In Step S7, a stop flag is set to a value of 1 indicative of satisfaction of the automatic engine stop conditions.

Thus, in response to the determination that the automatic engine stop conditions are satisfied, the engine is automatically stopped. As mentioned above, it is unknown when the engine is automatically restarted. Thus, if the engine is automatically restarted within a short time-period (e.g., several seconds), an aqueous urea solution cannot be fully recovered from the flow passage 6, and a part of the aqueous urea solution remains in the flow passage 6. In this case, the driving of the pump 10 comes to nothing in terms of preventing damage of the flow passage 6, i.e., anti-freezing. Moreover, a risk of ammonia slip is increased. Therefore, in Step S8, as measures against the above problems occurring when the engine is automatically stopped, the recovery of an aqueous urea solution from the flow passage 6 is prohibited. Specifically, each of the pump 10, the directional selector valve 11 and the addition valve 3 is turned off.

Then, in Step S9, each of a fuel injection system and an ignition system of the engine is turned off to automatically stop the engine.

In reality, during the operation of closing the addition valve, a certain level of leakage of an aqueous urea solution is unavoidable. Thus, if the engine is still running after the leakage of an aqueous urea solution, ammonia can be absorbed by the NOx SCR catalyst 4 to prevent ammonia slip. In this respect, it is meaningful to turn off (close) the addition valve 3 in Step S8, and then execute the automatic engine stop control in Step S9.

As described above, in Step S6, it is determined whether the exhaust gas temperature Te is equal to or less than a predetermined value. This is not an essential condition for an automatic engine stop control based on so-called "idling stop function". However, in this embodiment, the above condition is added as one of the automatic engine stop conditions. The reason is as follows.

The same type as a conventional fuel injection valve (injector) may be used as the addition valve 3. However, this type of injector is disadvantage in that it has relatively low thermal resistance. In this situation, an effect of cooling the addition valve 3 relies mainly on an aqueous urea solution injected through the addition valve 3. Thus, if the injection of an aqueous urea solution is stopped when the addition valve has a high temperature, the addition valve 3 is highly likely to be thermally damaged. Therefore, in this embodiment, the exhaust gas temperature Te is used as a parameter value relating to a temperature of the addition valve 3, and a condition that the parameter value is equal to or less than a predetermined value is added as one of the automatic engine stop conditions.

If any one of the conditions in Step S3 to S6 is not satisfied, it is determined that the automatic engine stop conditions are not satisfied, and the stop flag is set to a value of 0 indicative of non-satisfaction of the automatic engine stop conditions. In this case, the running of the engine will be continued. Thus, in Step S11, each of the pump 10 and the addition valve is turned on, and the directional selector valve 11 is turned off to allow the flow direction of an aqueous urea solution to be set in the supply direction. Further, in Step S12, each of the fuel injection system and the ignition system of the engine is turned on.

In Step S2, if it is determined that the ignition switch position IGs is an OFF position, the routine advances to Step S13. In Step S13, it is determined whether the ignition switch position IGs in a last control cycle is the ON position. A condition that the last ignition switch position IGs is the ON position, and the current ignition switch position IGs (in Step S2) is the OFF position means that the engine is forcibly stopped. If it is determined that the engine is forcibly stopped (YES in Step S13), the routine advances to Step S14. In Step S14, a recovery flag is set to a value of 1 indicative of execution of an aqueous-urea-solution recovery control. Then, in Step S15, a timer t is started.

Then, in Step S16, each of the pump 10 and the addition valve 3 is turned on, and the directional selector valve 11 is turned on to allow the flow direction of an aqueous urea solution to be set in the recovery direction. Thus, an operation of recovering an aqueous urea solution from the flow passage 6 to the tank 5 is started. The reason why the addition valve 3 is tuned on (opened) in the above control is to suck air into the flow passage 6 during the recovery operation.

In Step S17, it is determined whether the timer t has reached a predetermined time required for completion of the recovery operation. If it is determined whether the timer t has not reached the predetermined time, the routine returns to START. Then, when this process is restarted, in each of Step S2 and S13, it is determined that the ignition SW position is the OFF position, and the routine advances to Step S21. In Step S21, it is determined whether the recovery flag is 1. If it is determined that the recovery flag is 1, i.e., the recovery operation is continued, the routine advances to Step S14 to continue the recovery operation.

Subsequently, when the recovery operation progresses, and, in Step S17, it is determined that the timer t has reached the predetermined time, the routine advances to Step 18. Otherwise, in Step S21, if it is determined that the recovery flag is 0 which indicates that the recovery operation after the forcible engine stop is completed, the routine also advances to Step S18. In Step S18, the recovery flag is set to 0. Then, in Step S19, each of the pump 10, the directional selector valve 11 and the addition valve 3 is turned off to terminate the recovery operation. Then, in Step S20, each of the fuel injection system and the ignition system of the engine is turned off to automatically stop the engine.

FIG. 3 is a flowchart showing an automatic engine restart control process in the engine exhaust emission control system according to the embodiment. This control process is repeatedly executed in a given cycle period by the ECU 8, along with the engine control process and the exhaust gas emission control process.

In Step A1, the accelerator pedal angle θ and the brake switch position Bs are acquired. Then, in Step A2, it is determined whether the stop flag is set to 1. In other words, in Step A2, it is determined whether the engine is automatically stopped by the process in Steps S7 to S9 executed in response to satisfaction of the automatic engine stop conditions. If it is determined that the stop flag is 0, i.e., the engine is running, the sub-routine returns to START. If it is determined that the stop flag is 1, the sub-routine advances to Step A3.

In Steps A3 and A4, it is determined that automatic engine restart conditions are satisfied. Specifically, if it is determined that the brake switch position Bs is an OFF position, and the accelerator pedal angle θ is not the full closed angle, respectively, in Steps A3 and A4, it is finally determined that the automatic engine restart conditions are satisfied (Step A5). If the brake switch position Bs is the ON position, or the accelerator pedal angle θ is the full closed angle, it is determined that the automatic engine restart conditions are not satisfied, the sub-routine returns to START.

If it is finally determined that the automatic engine restart conditions are satisfied (Step A5), the starter of the engine is driven, and each of the fuel injection system and the ignition system is turned on, so as to automatically restart the engine.

In the above control process in this embodiment, when the engine is forcibly stopped, the aqueous-urea-solution recovery operation is performed (Step S16). Differently, when the engine is automatically stopped based on the so-called idling stop function, the aqueous-urea-solution recovery operation is prohibited (Step S8). This makes it possible to eliminate unnecessary driving of the pump 10, and effectively suppress ammonia slip due to leakage of an aqueous urea solution.

As described above, the present invention can be summarized as follows.

In accordance with one aspect of the present invention, there is provided an exhaust emission control system for an engine, which comprises: control means operable, in response to satisfaction of a given stop condition, to automatically stop the engine, and subsequently, in response to satisfaction of a given restart condition, to automatically restart the automatically stopped engine; a flow passage for an aqueous urea solution for reducing nitrogen oxides contained in exhaust gas of the engine; and supply/recovery means adapted to drive a pump to supply an aqueous urea solution to the flow passage and recover an aqueous urea solution from the flow passage, wherein the control means is operable, when the engine is forcibly stopped by turning off an ignition switch, to instruct the supply/recovery means to recover an aqueous urea solution from the flow passage, and, when automatically stopping the engine in response to satisfaction of the given stop condition, to prohibit the supply/recovery means from recovering an aqueous urea solution from the flow passage.

The exhaust emission control system of the present invention can suppress unnecessary driving of the pump, and leakage of an aqueous urea solution during re-supply of an aqueous urea solution.

Preferably, the exhaust emission control system of the present invention further comprises addition control means operable to control an addition valve adapted to add the aqueous urea solution from the flow passage into the exhaust gas, wherein the control means is operable, during the automatic engine stop operation, to automatically stop the engine after the addition valve is closed under control of the addition control means.

According to this feature, ammonia slip can be effectively suppressed.

Preferably, the exhaust emission control system of the present invention further comprises detection means operable to detect a parameter value relating to a temperature of the addition valve, wherein the control means is adapted, when the parameter value detected by the detection means is greater than a predetermined value, to be prohibited from automatically stopping the engine.

According to this feature, when the addition valve has a high temperature, the running of the engine will be continued, and thereby an aqueous urea solution will be continuously injected from the addition valve. Thus, it can be expected to ensure an addition-valve cooling effect to suppress a failure of the addition valve.

As above, the present invention can provide an exhaust emission control system having both an automatic engine stop/restart function and an aqueous-urea-solution recovery function, which is capable of suppressing unnecessary driving of a pump in connection with an operation of recovering an aqueous urea solution, while preventing leakage of the aqueous urea solution.

This application is based on Japanese Patent Application Serial No. 2008-243325, filed in Japan Patent Office on Sep. 22, 2008, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An exhaust emission control system for an engine, comprising:
a flow passage adapted to allow an aqueous urea solution for reducing nitrogen oxides contained in exhaust gas of the engine, to pass therethrough;
a supply/recovery section including a drive a pump and a selector valve to supply an aqueous urea solution to the flow passage and recover an aqueous urea solution from the flow passage, and
a electronic control unit including an algorithm which when implemented performs a process to control the supply/recovery section and, in response to a predetermined stop condition, to automatically stop the engine, and subsequently, in response to a predetermined restart condition, to automatically restart the automatically stopped engine;
wherein the electronic control unit programmed to, when the engine is forcibly stopped by turning off an ignition switch, instruct the supply/recovery section to recover an aqueous urea solution from the flow passage, and, when automatically stopping the engine in response to the predetermined stop condition while said ignition switch remains ON, to prohibit the supply/recovery section from recovering an aqueous urea solution from the flow passage.

2. The exhaust emission control system according to claim 1 further comprises an addition valve adapted to add the aqueous urea solution from the flow passage into the exhaust gas, wherein the electronic control unit further includes an addition control section having an algorithm which when implemented performs a process operable to control the addition valve wherein the electronic control unit programmed to, during the automatic engine stop operation, automatically stop the engine after the addition valve is closed under control of the addition control section.

3. The exhaust emission control system according to claim 2, wherein the electronic control unit further comprises a detection section operable to detect a parameter value relating to a temperature of the addition valve, wherein the electronic control unit programmed to, when the parameter value detected by the detection section is greater than a predetermined value, to prohibit the engine from being automatically stopped.

4. The exhaust emission control system according to claim 3, wherein the detection section is operable to detect a temperature of the exhaust gas as the parameter value relating to the temperature of the addition valve.

5. The exhaust emission control system according to claim 1, wherein the predetermined stop condition includes one of: (1) a condition that a vehicle speed is zero; (2) a condition that an accelerator pedal angle is zero; (3) a condition that a brake pedal is depressed; and (4) a condition that a temperature of the exhaust gas is equal to or less than a predetermined value.

6. A method of controlling an exhaust emission control system of an engine, wherein the exhaust emission control system includes: a electronic control unit, a flow passage for an aqueous urea solution for reducing nitrogen oxides contained in exhaust gas of the engine; a supply/recovery section including a pump to supply an aqueous urea solution to the flow passage, the method comprising:
- in response to a predetermined stop condition, automatically stopping the engine, and subsequently, in response to given a predetermined restart condition, automatically restart restarting the automatically stopped engine;
- recovering an aqueous urea solution from the flow passage when the engine is forcibly stopped by turning off an ignition switch,
- automatically stopping the engine in response the predetermined stop condition when said ignition switch remains ON, while prohibiting the supply/recovery section from recovering an aqueous urea solution from the flow passage, under control of the electronic control unit.

7. The method according to claim 6, further comprising, when the engine is forcibly stopped by turning off an ignition switch, allowing the supply/recovery section to recover an aqueous urea solution from the flow passage, under control of the electronic control unit.

8. The method according to claim 7, wherein the exhaust emission control system further includes an addition control section operable to control an addition valve adapted to add the aqueous urea solution from the flow passage into the exhaust gas, wherein automatically stopping the engine includes opening the addition valve under control of the addition control section, and then automatically stopping the engine under control of the electronic control unit.

9. The method according to claim 8, wherein the exhaust emission control system further includes a detection section operable to detect a parameter value relating to a temperature of the addition valve, wherein the method further comprises, when the parameter value detected by the detection section is greater than a predetermined value, allowing the electronic control unit to prohibit the engine from being automatically stopped.

10. The method according to claim 9, wherein the detection section is operable to detect a temperature of the exhaust gas as the parameter value relating to the temperature of the addition valve.

* * * * *